(12) United States Patent
Higo et al.

(10) Patent No.: US 6,196,019 B1
(45) Date of Patent: Mar. 6, 2001

(54) ACCUMULATOR

(75) Inventors: Yutaka Higo; Keiji Yamazaki; Takayuki Fujii, all of Tochigi (JP)

(73) Assignee: Showa Aluminum Corporation, Osaka (JP)

( * ) Notice: Subject to any disclaimer, the term of this patent is extended or adjusted under 35 U.S.C. 154(b) by 0 days.

(21) Appl. No.: 09/347,643

(22) Filed: Jul. 6, 1999

Related U.S. Application Data

(63) Continuation-in-part of application No. 08/991,417, filed on Dec. 16, 1997, now Pat. No. 6,122,929.

(30) Foreign Application Priority Data

Jul. 13, 1998 (JP) .................................................. 10-196916
Jun. 11, 1999 (JP) .................................................. 11-164568

(51) Int. Cl.$^7$ .................................................. F25B 43/00
(52) U.S. Cl. .................................................. 62/474; 62/503
(58) Field of Search .................................................. 62/85, 195, 474, 62/470, 471, 503; 96/133, 135, 137, 147

(56) References Cited

U.S. PATENT DOCUMENTS

| | | | |
|---|---|---|---|
| 4,270,934 | 6/1981 | Widdowson et al. | 55/316 |
| 4,331,001 | 5/1982 | Jones | 62/503 |
| 4,354,362 | 10/1982 | Schumacher et al. | 62/474 |
| 4,509,340 | 4/1985 | Mullally et al. | 62/503 |
| 4,768,355 | * 9/1988 | Breuhan et al. | 62/503 |
| 5,596,882 | * 1/1997 | Hutchison et al. | 62/503 |

FOREIGN PATENT DOCUMENTS 0 849 549  6/1998  (EP) .

* cited by examiner

*Primary Examiner*—William E. Tapolcai

(57) ABSTRACT

An accumulator includes a tank, a refrigerant inlet port provided at an upper portion of the tank, a refrigerant outlet port provided at the upper portion of the tank, a dryer unit disposed in the tank at an intermediate portion along a direction of height of the tank, and a separating wall extending upwardly from the dryer unit and dividing an upper inner space of the tank above the dryer unit into an inlet side upper space located at the refrigerant inlet part side and an outlet side upper space located at the refrigerant outlet side port. The separating wall has a plurality of apertures formed in a scattered state for communicating the inlet side upper space and the outlet side upper space each other. The accumulator includes an oil returning tube having a lower inlet opening and an upper outlet opening. The oil returning tube is disposed in the tank such that the lower inlet opening and the upper outlet opening are located at a bottom portion of the tank and at the refrigerant outlet port, respectively.

15 Claims, 15 Drawing Sheets

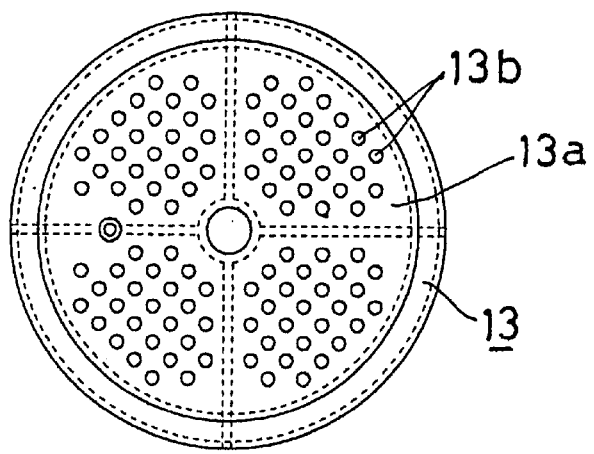
FIG. 5C
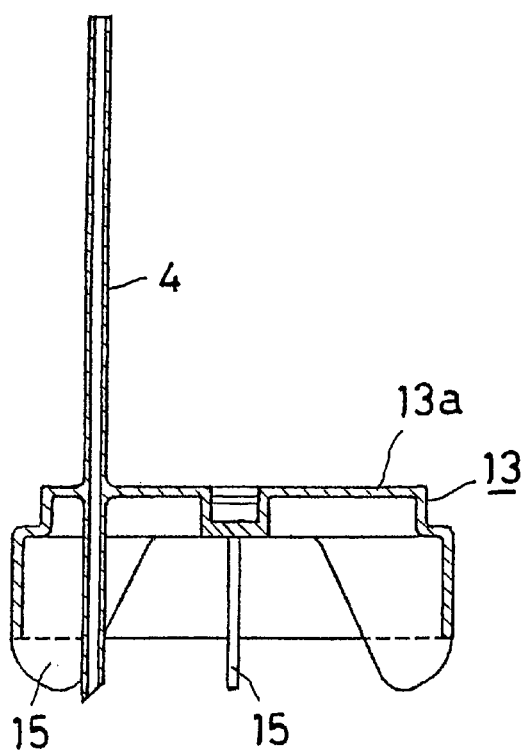 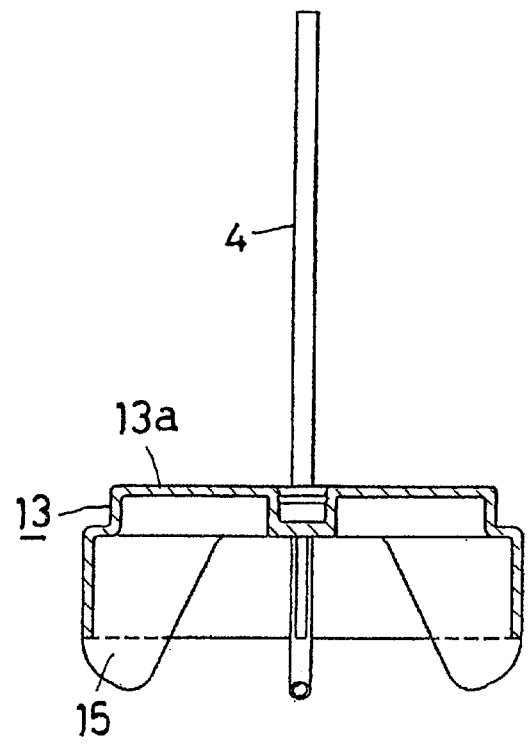
FIG. 5A FIG. 5B

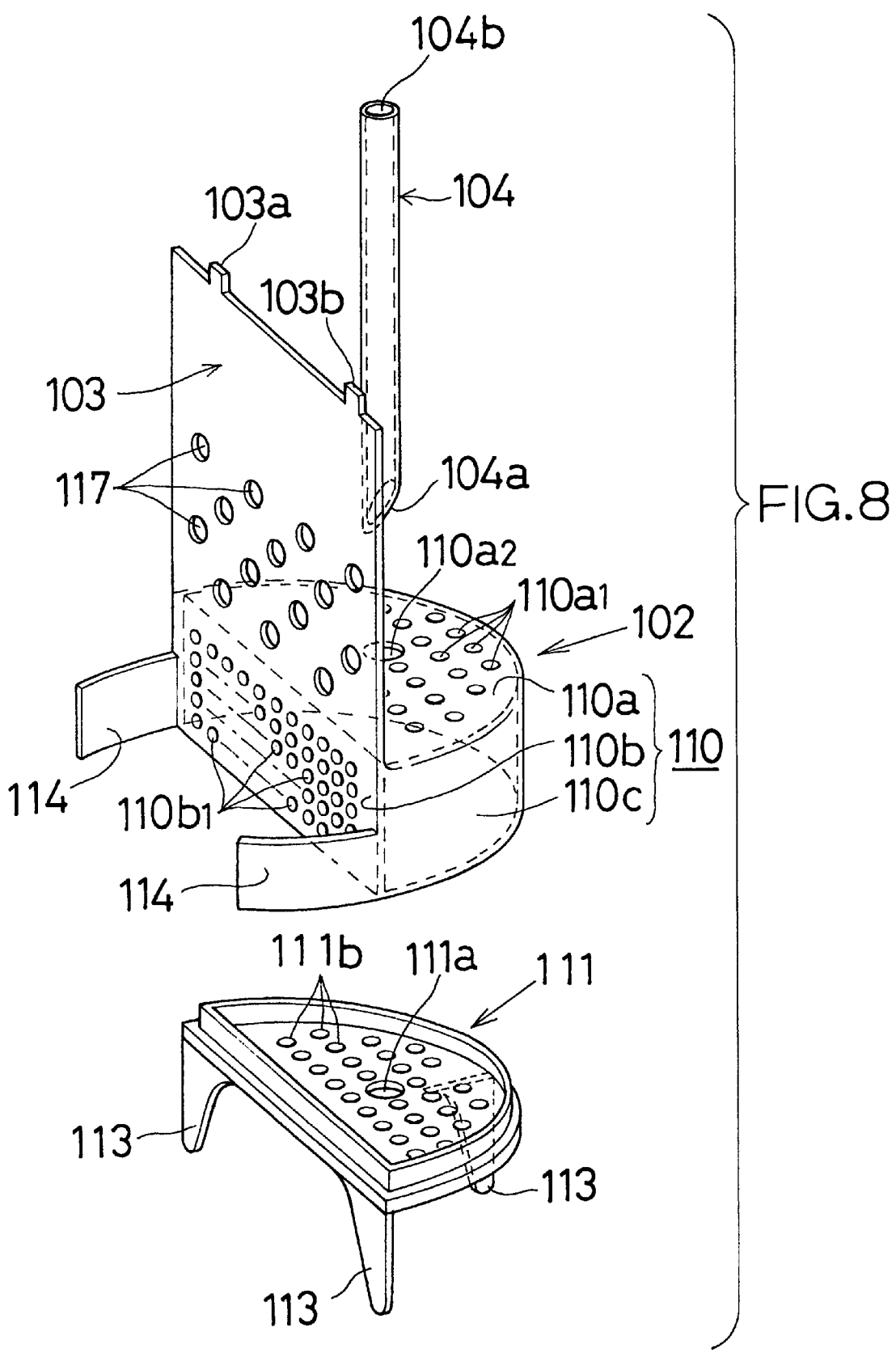

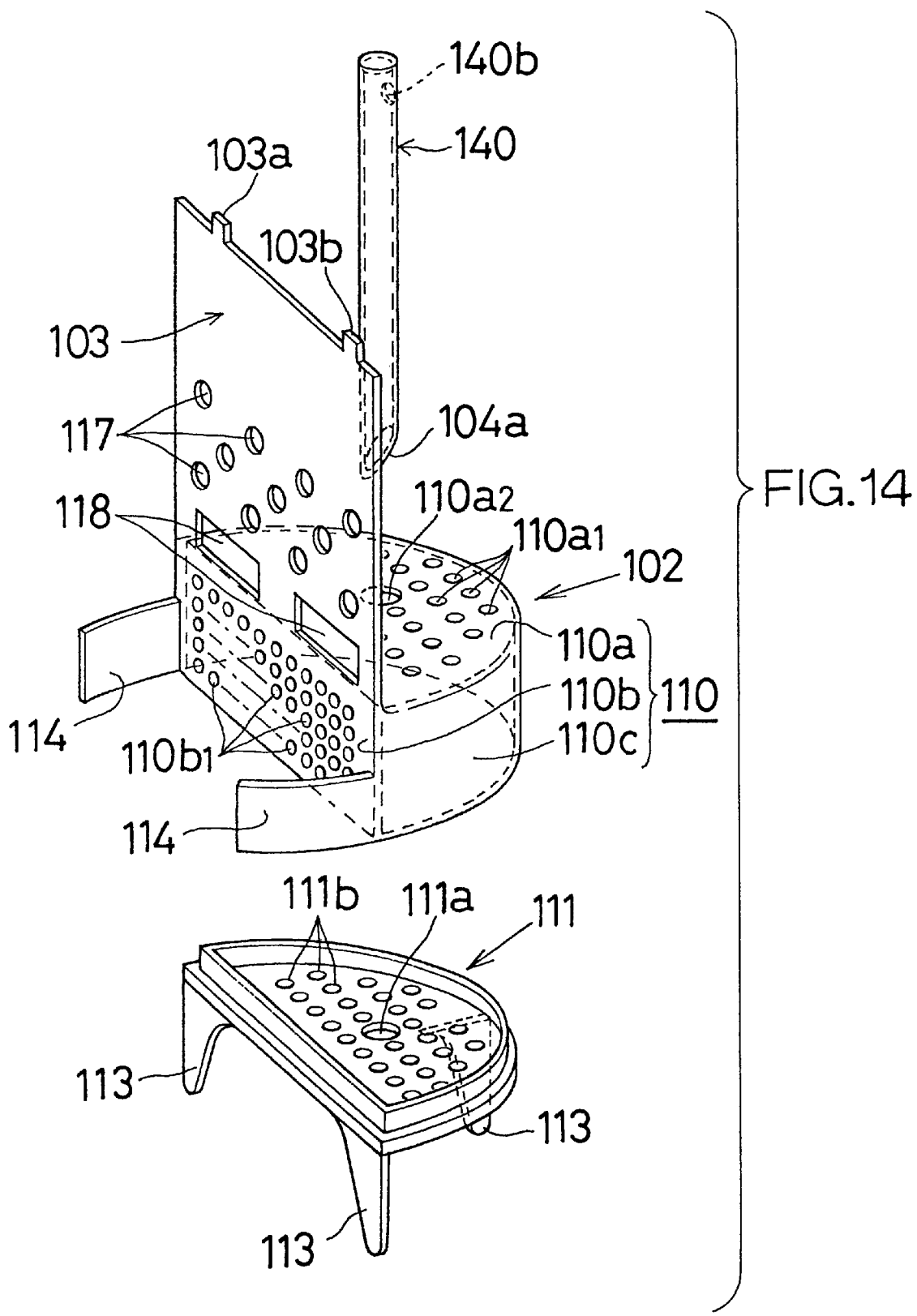

ACCUMULATOR

This application is a continuation-in-part application of the U.S. patent application Ser. No. 08/991,417 filed on Dec. 16, 1997, now U.S. Pat. No. 6,122,929.

BACKGROUND OF THE INVENTION

1. Field of the Invention

The present invention relates to an accumulator used in a refrigerant cycle for an automobile air conditioner or the like.

2. Description of the Related Art

One example of a conventional accumulator is shown in FIG. 15. The accumulator includes a U-shaped suction pipe 204 provided in a tank 201 for separating refrigerant evaporated in an evaporator (not shown) into gaseous refrigerant and liquid refrigerant. A defroster 220 in the shape or an umbrella or a reversed-cup is also provided in the tank 210 for an effective separation of gaseous refrigerant and liquid refrigerant, even in a case where the accumulator vibrates or swings. Also provided in the tank 201 is a dryer unit 202 to dehydrate the refrigerant. The dryer unit 202 has a specific configuration so as to avoid the suction pipe 204. At the bottom portion of the tank 201, an oil returning opening (not shown) is provided in order to return lubricant oil to a compressor (not shown). A filter having a specific structure is provided in the suction pipe 204 at the bottom portion thereof.

As explained above, a conventional accumulator is composed of many parts including the suction pipe 204, the defroster 220, the dryer unit 202, and the filter. Further, each of these parts has a complicated and peculiar shape and/or structure, which causes an increase in a manufacturing cost of the accumulator.

The conventional accumulator has other drawbacks that a refrigerant pressure loss in the accumulator is relatively large because the refrigerant passes through the U-shaped suction pipe 204 provided in the tank 201, and the upper opening of the suction pipe 204 is covered by a defroster 220. The filter mounted in the suction pipe 204 also increases the loss of refrigerant pressure.

In this kind of refrigerant cycle, a certain amount of lubricant oil for lubricating a compressor (hereinafter referred to as "lubricant oil") is added to the refrigerant. In the accumulator constituting the refrigerant cycle, the refrigerant containing the lubricant oil is separated into gaseous refrigerant, liquid refrigerant and lubricant oil. Then, the gaseous refrigerant and the lubricant oil are introduced into a compressor from the accumulator. At the same time, in the accumulator, the refrigerant is dehydrated by the dryer unit 202 disposed in the tank 201.

Thus, an accumulator has various functions including a refrigerant-separate-function for separating refrigerant into gaseous refrigerant and liquid refrigerant, a liquid-store-function for storing liquid refrigerant, a oil-supply-function for supplying a certain amount of lubricant oil to a compressor, and a dehydrate-function for removing water contained in the refrigerant cycle.

In the tank 201, liquid refrigerant and lubricant oil are accumulated at the bottom portion of the tank 201 in a separated manner such that a liquid refrigerant layer stays on a lubricant oil layer because the former is lighter than the latter in specific gravity. Especially, in a case where a large amount of liquid refrigerant is accumulated in the tank 201, the lubricant oil cannot be supplied to the compressor until the liquid refrigerant forming the lower layer is completely discharged because the oil returning opening (not shown) is formed at the bottom portion of the tank 201. As a result, the aforementioned oil-supply-function of the accumulator cannot be performed.

Furthermore, immediately after the refrigeration cycle begins to operate, the liquid refrigerant may be supplied to a compressor through the oil returning opening, which may cause trouble of the compressor.

SUMMARY OF THE INVENTION

The present invention has been made to overcome the disadvantages of the conventional accumulator as described above.

An object of the present invention is to provide an accumulator having a reduced number of parts and a simplified structure, which can be manufactured at a low cost.

Another object of the present invention is to provide an accumulator having a structure which can decrease the loss of refrigerant pressure and improve system efficiency.

Still another object of the present invention is to provide an accumulator which can effectively supply lubricant oil, which tends to stay at a bottom portion of the accumulator, to a compressor.

According to one aspect of the present invention, an accumulator includes a tank, a refrigerant inlet and outlet ports each provided at an upper portion of the tank, and a dryer unit disposed in the tank at an intermediate portion along the direction of height of the tank. The accumulator also includes a separating wall extending upwardly from the dryer unit and dividing an upper inner space of the tank above the dryer unit into an inlet side upper space located at the refrigerant inlet port side and an outlet side upper space located at the refrigerant outlet port side. The separating wall has a plurality of apertures formed in a scattered state for communicating the inlet side upper space and the outlet side upper space with each other. Further, the accumulator includes an oil returning tube having a lower inlet opening and an upper outlet opening, wherein the oil returning tube in disposed in the tank such that the lower inlet opening and the upper outlet opening are located at a bottom portion of the tank and at the refrigerant outlet port, respectively.

As mentioned above, the upper inner space located above the dryer unit is divided into an inlet side upper space and an outlet side upper space, and these right and left upper spaces are communicated with each other through a plurality of apertures formed in the separating wall. Accordingly, when a mixture of liquid refrigerant and gaseous refrigerant is introduced into the inlet side upper space, the gaseous refrigerant flows from the inlet side upper space to the outlet side upper space through a plurality of apertures formed in the separating wall. Thus, the pressure loss of the refrigerant passing thought the accumulator can be decreased. Also, the inside structure of the accumulator can be simplified.

It is preferable that a refrigerant passing space is formed between an inner surface of the tank and the dryer unit so that refrigerant introduced into the tank through the refrigerant inlet port is arrived directly or indirectly at the bottom portion of the tank through the refrigerant passing space, whereby the refrigerant is agitated in the tank. In this case, lubricant oil and liquid refrigerant can be effectively agitated at the bottom portion of the tank, which enables to circulate the lubricant oil in the refrigeration cycle without causing a stagnation of the lubricant oil in the accumulator.

It is preferable that a ratio of a total area of the apertures formed in the separating wall to a cross-sectional area of the refrigerant inlet port falls within a range of from 1.3 to 3. In this case, the plurality of apertures formed in the separating wall can prevent a free communication between the refrigerant inlet port and the refrigerant outlet port to some degree, which enables the separating wall to function as a separator and causes the refrigerant to pass through the dryer unit.

It is preferable that a cross-sectional area of the oil returning pipe is 20 to 50% of a cross-sectional area of the refrigerant outlet port. This enables an effective pumping of the lubricant oil out of the tank.

It is preferable that the separating wall has an opening for communicating the inlet side upper space and the outlet side upper space with each other at a lower end portion of the separating wall. This prevents an accumulation of liquid refrigerant in the outlet side upper space, whereby the liquid refrigerant can be effectively prevented from being sent out of the tank through the refrigerant outlet port in case where the rotation rate of the compressor is suddenly changed when, for example, an engine connected to the compressor is in the process of starting or stopping.

Further, it is preferable that the upper outlet opening of the oil returning tube is designed such that an angle θ formed between an opening direction of the upper outlet opening of the oil returning tube and a flow direction of refrigerant passing through the refrigerant outlet port meets a formula of $0°<θ\leq90°$. This enables the liquid refrigerant-accumulated in the bottom portion of the tank to be effectively sent out of the tank.

BRIEF EXPLANATION OF DRAWINGS

The above and other objects, features and advantages of the present invention will now be apparent from the following detailed description of the preferred embodiments with reference to the attached drawings, wherein;

FIGS. 1 to 5 shows an accumulator of a first embodiment according to the present invention.

FIG. 2 is a partially broken front cross-sectional view of the accumulator;

FIG. 5A is a front cross-sectional view of a cap-like cover of the dryer unit;

FIG. 5B is a side cross-sectional view of the cap-like cover;

FIG. 5C is a top plane view of the cap-like cover;

FIGS. 6 to 9 show an accumulator of a second embodiment according to the present invention.

FIG. 8 is a perspective view of the dryer unit in a disassembled state;

FIGS. 12 to 14 show an accumulator of a fifth embodiment according to the present invention.

FIG. 14 is a perspective view of the dryer unit in a disassembled state;

DETAILED DESCRIPTION OF THE PREFERRED EMBODIMENTS

A preferred embodiment of the present invention will now be described with reference to the accompanying drawings.

Figure 1B:
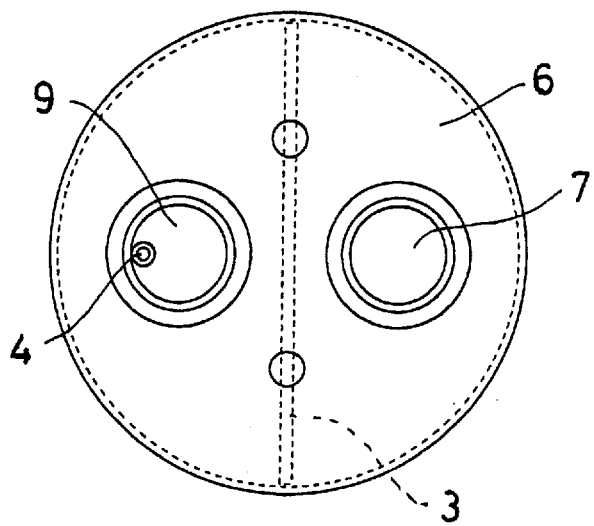
FIG. 1B is a top plan view of the accumulator.
Figure 1A:
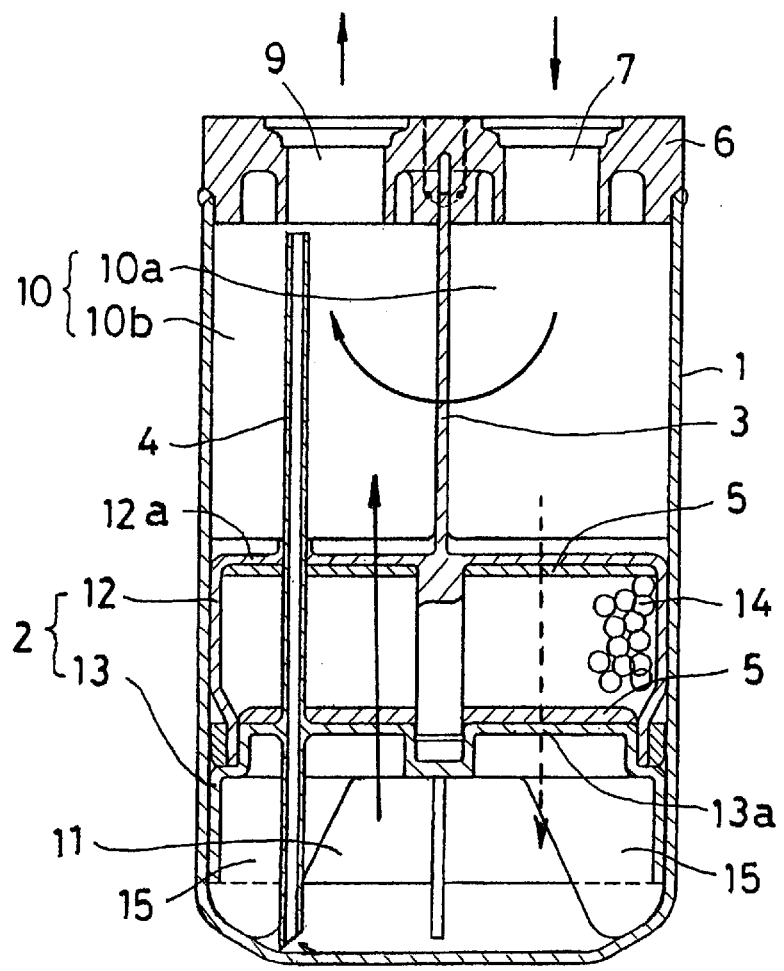
FIG. 1A is a front cross-sectional view of the accumulator.
Figure 2:
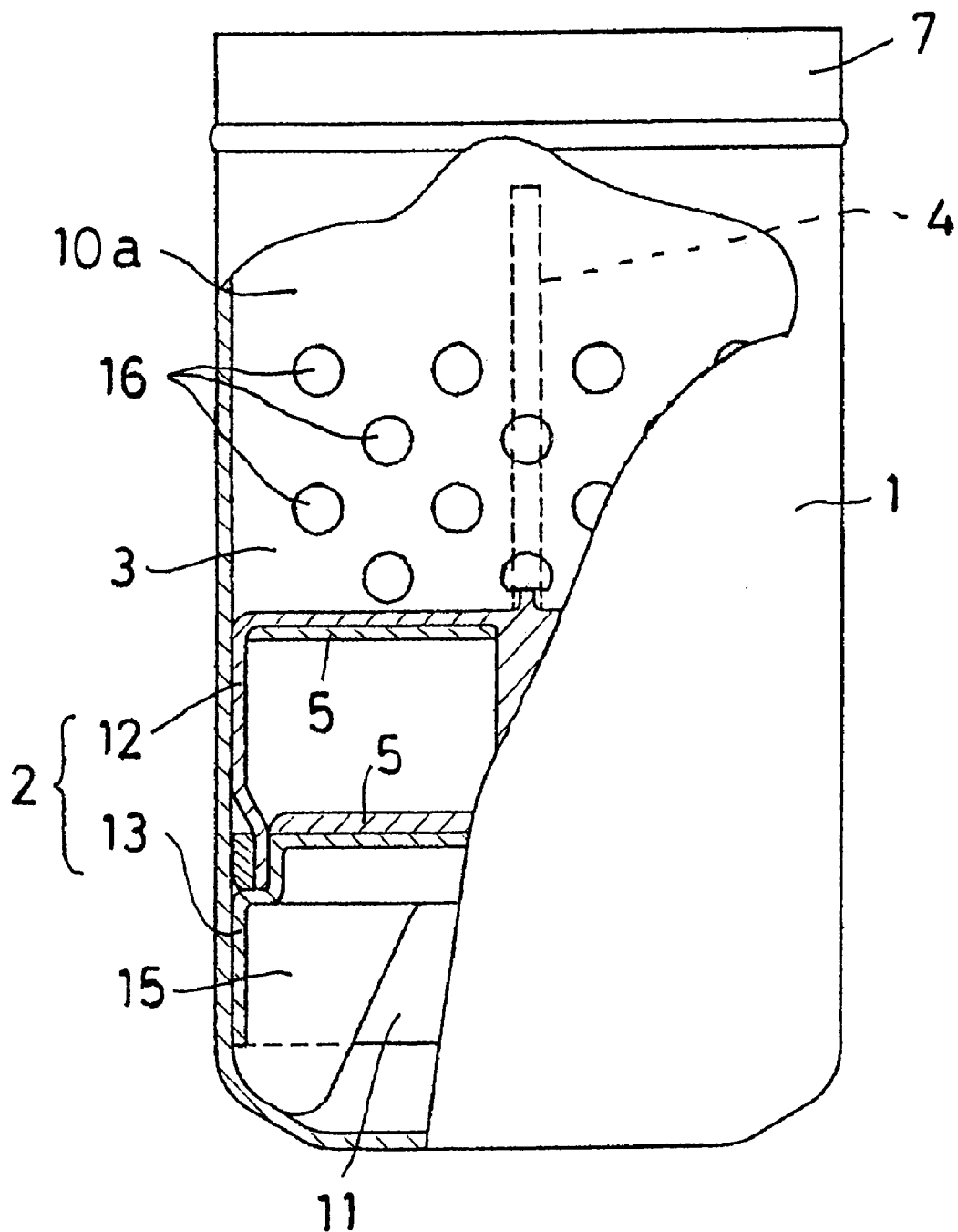

In the accumulator illustrated in FIGS. 1A, 1B and 2, the numerals 1 to 5 denote a tank, a dryer unit, a separating wall, an oil returning tube and a filter, respectively.

The tank 1 is in the shape of a cylinder having a bottom with a predetermined height. An upper opening of the tank 1 is closed by a header 6. The header 6 has a refrigerant inlet port 7 and a refrigerant outlet port 9. The dryer unit 2 is fitted in the tank 1 at an intermediate portion thereof in a direction of the height. The inside of the tank 1 is divided into an upper inner space 10 and a lower inner space 11 by the dryer unit 2. The upper and lower inner spaces 10, 11 communicate with each other through the dryer unit 2.

Figure 3C:
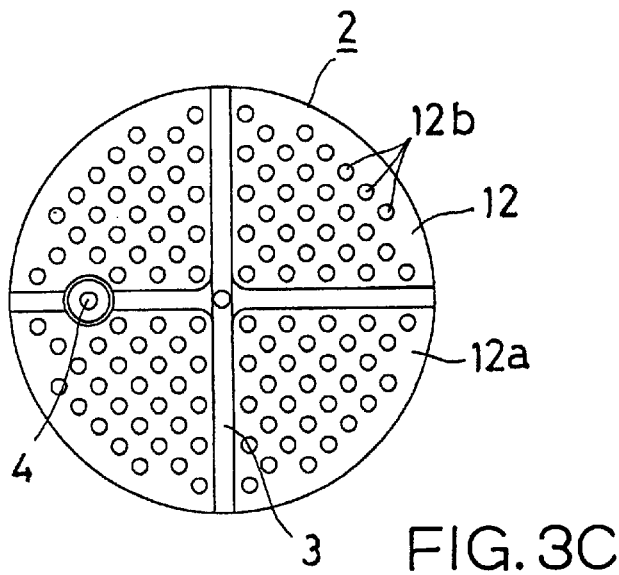
FIG. 3C is a top plan view of the dryer unit.
Figures 3A, 3B:
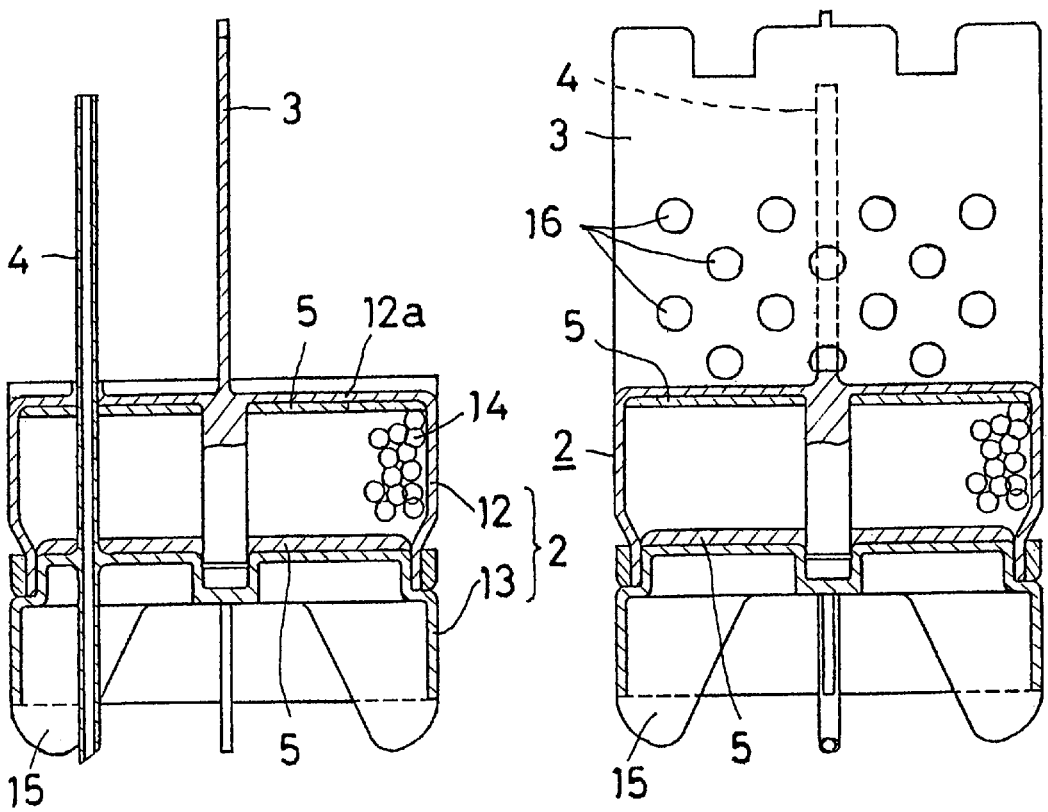
FIG. 3A is a front cross-sectional view of a dryer unit of the accumulator.
FIG. 3B is a side cross-sectional view of the dryer unit.
Figure 4C:
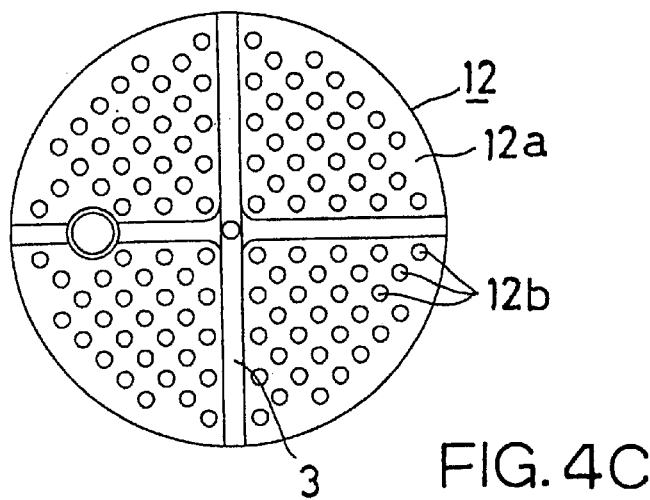
FIG. 4C is a top plan view of the reversed-cup like cover.

As shown in FIGS. 3 to 5, the dryer unit 2 includes a reversed cup-like cover 12 and a cap-like cover 13. A lower opening or the reversed cup-like cover 12 is closed by the cap-like cover 13, and dryer agents 14 are confined therebetween. The diameter of the outer periphery of the dryer unit 2 is generally the same as the diameter of the inner periphery of the tank 1. As shown in FIG. 4C, a plurality of small apertures 12b are provided in approximately the whole area of an upper wall 12a of the reversed cup-like cover 12. On the other hand, as shown in FIG. 5C, a plurality of small apertures 13b are provided in approximately the whole area of a covering portion 13a of the cap-like cover 13. The cap-like cover 13 has a plurality of downwardly protruded legs 15 integrally formed with the cap-like cover 13. With the dryer unit 2 supported by the legs 15 at a bottom of the tank 1, the inside of the tank 1 is divided by the dryer unit 2 into the upper inner space 10 and the lower inner space 11. The upper and lower inner spaces 10, 11 communicate with each other through the small apertures 12b formed in the upper wall 12a of the reversed cup-like cover 12 and the small apertures 13b formed in the covering portion of 13a of the cap-like cover 13.

The positions of the reversed cup-like cover 12 and cap-like cover 13 may be arranged such that an upper opening of the cup-like cover 12 is closed by the cap-like cover 13.

Figure 4A:
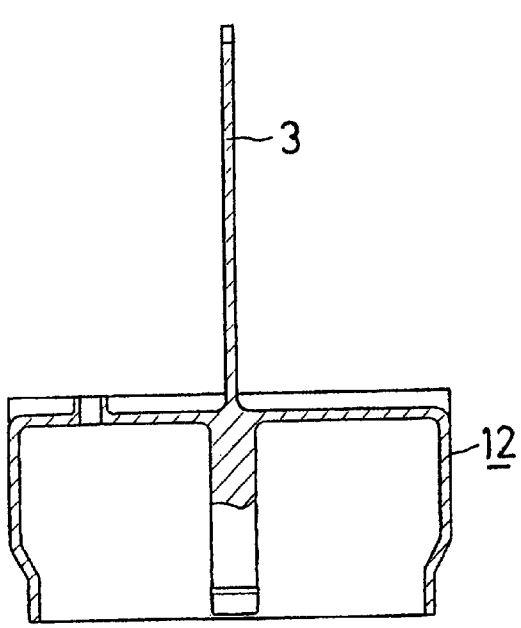
FIG. 4A is a front cross-sectional view of a reversed-cup like cover of the dryer unit.
Figure 4B:
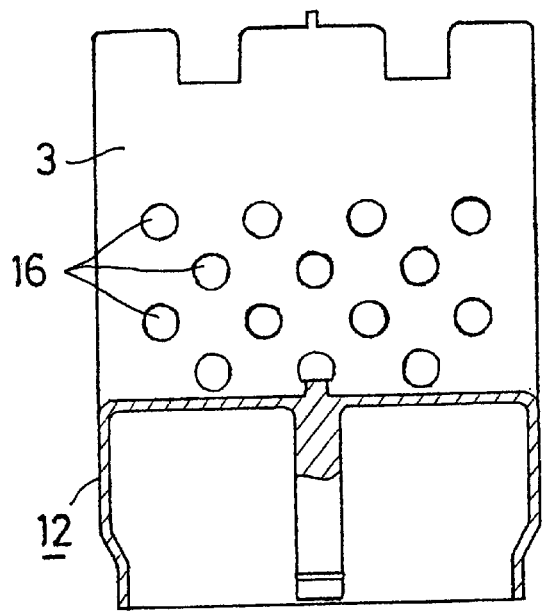
FIG. 4B is a side cross-sectional view of the reversed-cup like cover.

The separating wall 3 is a flat wall and placed in the upper inner space 10 of the tank 1 to divide the upper inner space 10 into a right upper space 10a and a left upper space 10b as shown in FIGS. 1A and 2. In FIG. 1A, the right upper space 10a communicates the refrigerant inlet port 7 of the header 6 to form a refrigerant inlet side upper space. On the other hand, the left upper space 10b communicates with the refrigerant outlet port 9 of the header 6 to form a refrigerant outlet side upper space. As shown in FIGS. 4A to 4C, the separating wall 3 is integrally formed with the reversed cup-like cover 12 such that the separating wall 3 protrudes upward from a top surface of the upper wall 12a of the reversed cup-like cover 12 of the dryer unit 2. As shown in FIG. 4B, a plurality of apertures 16 are provided in the separating wall 3 in a scattered state so that the right and left side upper spaces 10a, 10b communicate with each other through the apertures 16. The separating wall 3 may also be made so as not to be integrally formed with the reversed cup-like cover 12.

The oil returning tube 4 extends in a direction of up and down as shown in FIG. 1A. A lower end of the tube 4 is located at a bottom portion of the lower inner space 11 of the tank 1. An upper end of the tube 4 extends though the upper wall 12a of the reversed cup-like cover 12 of the dryer unit 2 and is located at an upper portion of the refrigerant outlet side upper space 10b of the upper inner space 10 to correspond to the refrigerant outlet port 9. As shown in FIGS. 5A to 5C, the tube 4 is integrally formed with the cap-like cover 13 of the dryer unit 2 and extends in an up and down direction from the covering portion 13a of the cap-like cover 13. The oil returning tube 4 may also be made so as not to be integrally formed with the cap-like cover 13.

As shown in FIGS. 1A and 3, a filter 5 is disposed along the whole area of a lower surface of the upper wall 12a of the reversed cup-like cover 12, and another filter 5 is disposed along the whole area of the upper surface of the covering portion 13a of the cap-like cover 13.

In assembling the accumulator, the reversed cup-like cover 12 and the cap-like cover 13 are combined to form the dryer unit 2 such that the dryer agent 14 and the filters 5, 5 are contained within the dryer unit 2. Then, the dryer unit 2 is inserted into the tank 1, and thereafter the tank 1 is closed by the header 6. Thus, assembly of the accumulator can be performed extremely easily.

The tank 1, the header 6, the reversed cup-like cover 12, the cap-like cover 13, and the like, may be made of materials having a good formability such as an aluminum, an aluminum alloy, a resin, or the like.

In the above-described accumulator, the mixture of liquid refrigerant and gaseous refrigerant, which has been evaporated in an evaporator (not shown), is introduced into the refrigerant inlet side upper space 10a through the inlet port 7 of the header 6 as shown in FIG. 1A. However, the liquid refrigerant is intercepted by the separating wall 3 to follow through to the refrigerant outlet side upper space 10b. The liquid refrigerant, thus, goes downward as indicated by the dotted arrow as illustrated in FIG. 1A. While, the gaseous refrigerant is sucked into the refrigerant outlet side upper space 10b through the apertures 16 of the separating wall 3. Thus, the gaseous refrigerant is separated from the liquid refrigerant and only the gaseous refrigerant is sucked from the refrigerant outlet side upper space 10b into a compressor (not shown) through the outlet port 9.

The refrigerant can pass through the accumulator with a small pressure loss because the gaseous refrigerant flows through the large upper inner spaces 10a and 10b divided by the separating wall 3 and the gaseous refrigerant travels from the refrigerant inlet side upper space 10a to the refrigerant outlet side upper space 10b through a plurality of apertures 16 provided in the separating wall, 3 in a scattered state.

The liquid refrigerant goes downward as described above and is accumulated in the lower inner space 11 after contained water is removed by the dryer unit 2. The gaseous phase of the refrigerant in the lower inner space 11 is sucked up into the refrigerant outlet side upper space 10b through the dryer unit 2 as shown by the solid arrow illustrated in FIG. 1A, and is then sucked into a compressor (not shown).

Lubricant oil for the compressor contained in the refrigerant goes downward together with the liquid refrigerant and passes through the dryer unit 2. Impurities included in the lubricant oil are removed by the filters 5, 5 provided in the dryer unit 2. After that, the oil is collected in the lower inner space 11 and then sucked up through the oil returning tube 4 into a compressor (not shown) together with the gaseous refrigerant.

To separate the gaseous refrigerant from the liquid refrigerant, only the separating wall 3 having a plurality of apertures 16 provided therein in a scattered state is provided. Besides, the separating wall 3 is integrally formed with the dryer unit 2. Thus the number of parts is reduced.

Further, the separation of the gaseous refrigerant and the liquid refrigerant and the removal of water, etc., are conducted by means of the structure that the dryer unit 2 dividing the inside of the tank 1 into the upper and lower inner spaces 10, 11 is provided in the tank 1 and the separating wall 3 located in the upper inner space 10 above the dryer unit 2 to divide it into the right and left upper spaces 10a, 10b is provided. Therefore, a suction pipe of a complicated shape can be excluded, and the structure of the dryer unit 2 can be simplified. And thus, a simple inner structure of the tank can be accomplished. Further because the oil returning tube 4 is integrally formed with the dryer unit 2, the number or parts for returning oil is reduced. Furthermore, because the upper inner space 10 and lower inner space 11 of tank 1 communicate through the filters S for removal of impurities, which are provided in the dryer unit 2, impurities are removed by the filters 5. Accordingly, it is no longer necessary to provide a filter having a peculiar structure at the lower end portion of the oil returning tube 4. Thus, the inner structure of the tank 1 for the oil returning is simplified and the pressure loss is also decreased.

FIGS. 6 to 9 illustrate another embodiment of the present invention.

Figure 6A:
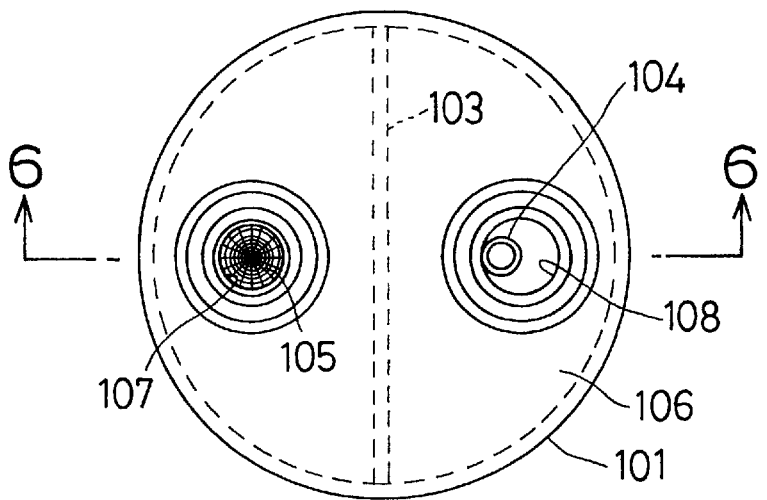
FIG. 6A is a top plan view of the accumulator.
Figure 6B:
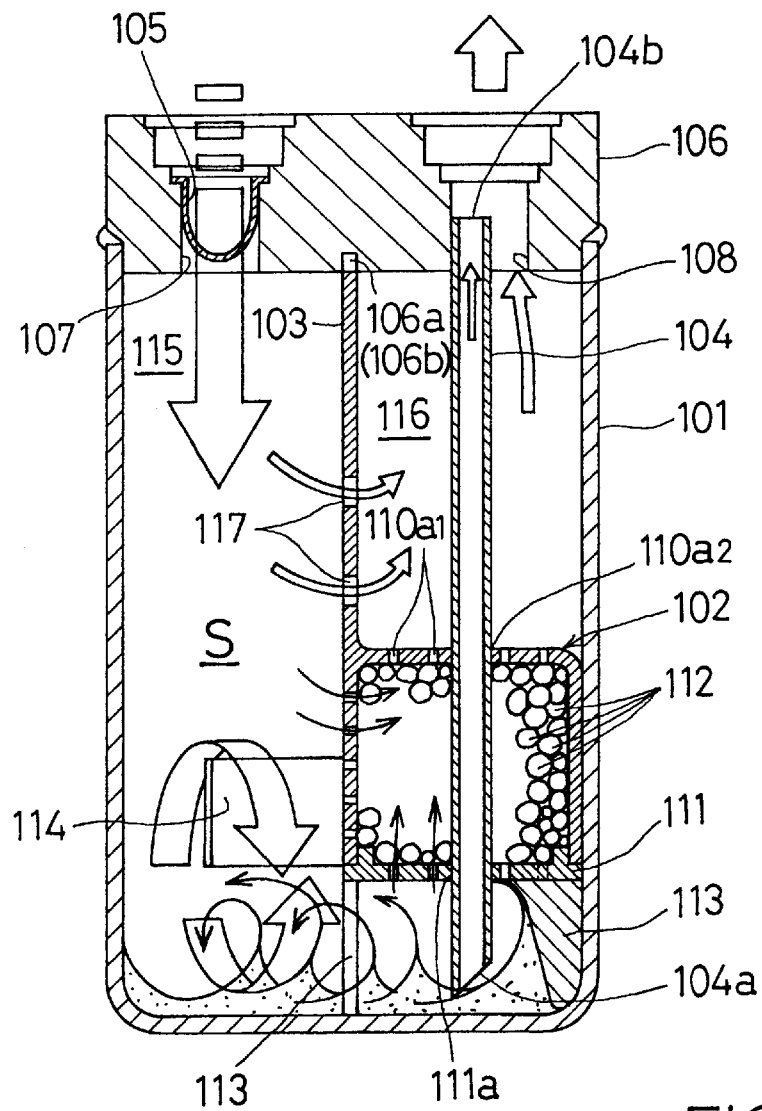
FIG. 6B is a cross-sectional view taken along the lines 6—6 of FIG. 6A.
Figure 7A:
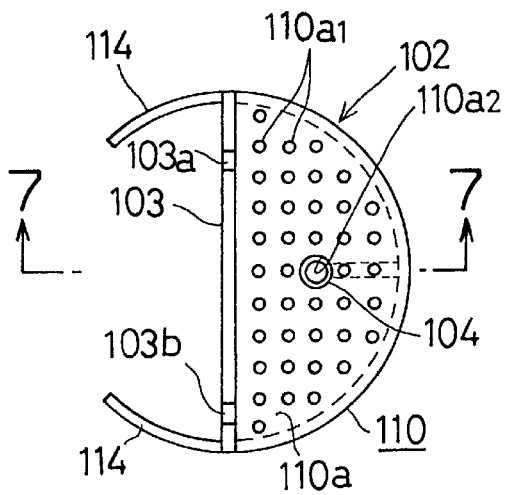
FIG. 7A is a top plan view of a dryer unit of the accumulator.
Figure 7C:
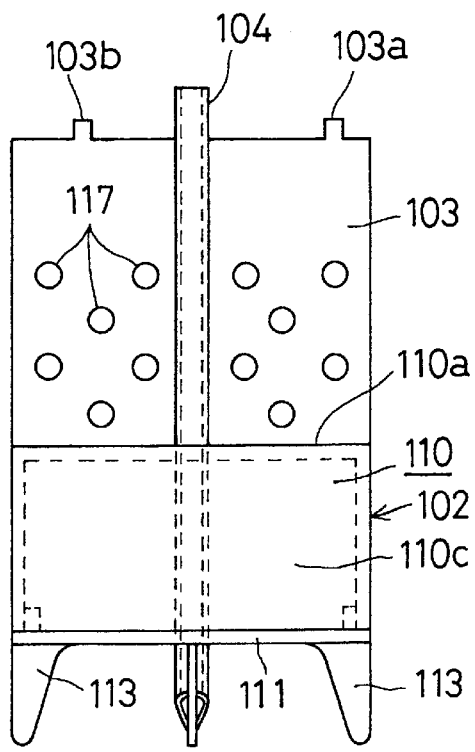
FIG. 7C is a right side view of the dryer unit.
Figure 7B:
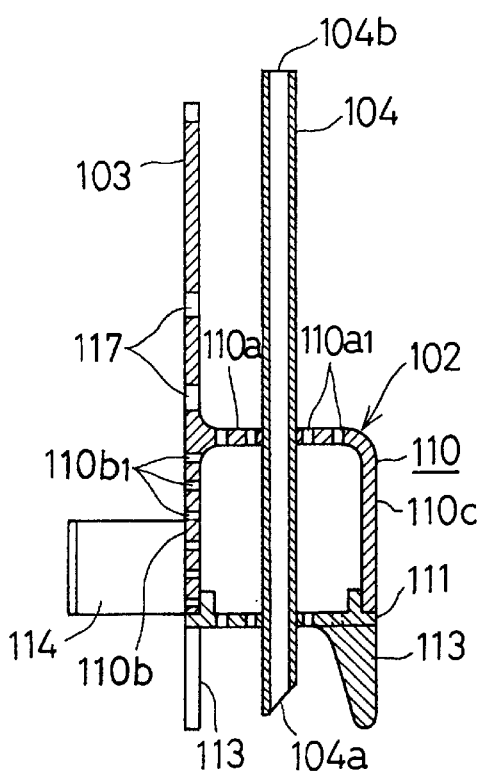
FIG. 7B is a cross-sectional view taken along the lines 7—7 of FIG. 7A.
Figure 7D:
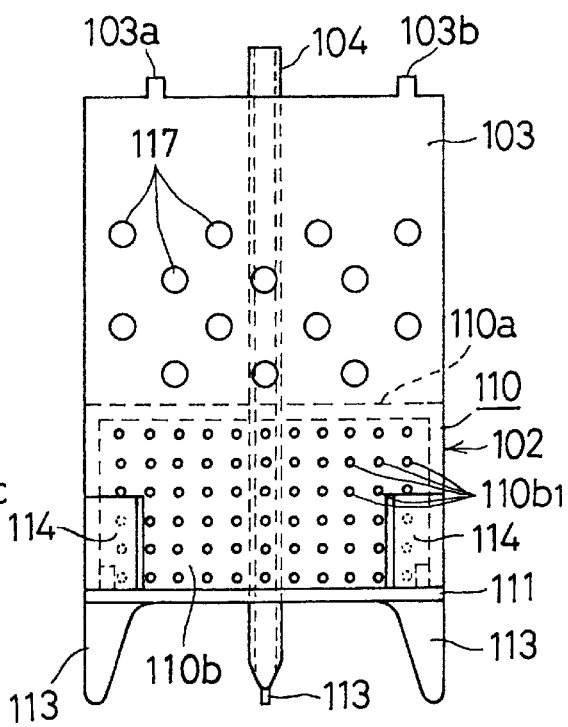
FIG. 7D is a left side view of the dryer unit.

In FIGS. 6A and 6B, the reference numerals 101, 102, 103, 104 and 105 denote a tank, a dryer unit, a separating wall, an oil returning pipe and a filter, respectively.

The tank 101 has a cylindrical shape having a certain height with a bottom wall. The upper opening of the tank 101 is closed by a header 106. The header 106 is provided with a refrigerant inlet port 107 and a refrigerant outlet port 108. Provided in the tank 101 is the dryer unit 102. The dryer unit 102 is disposed at the intermediate portion of the tank 101 in the direction of height of the tank 101 so as to be located below the refrigerant outlet port 108.

As shown in FIGS. 7 and 8, the dryer unit 102 has a semi-circular cylindrical member 110 having a lower opening closed by a bottom lid member 111. The semi-circular cylindrical member 110 includes a semi-circular upper wall 110a, a flat side wall 110b and a curved-side wall 110c downwardly extending from the peripheral edge of the upper wall 110a. The lower opening of the semi-circular cylindrical member 110 is closed by the bottom lid member 111 such that a dyer agent 112 is accommodated in a space formed by the cylindrical member 110 and the bottom lid member 111. The diameter of the outer periphery of the semi-circular cylindrical member 110 is generally the same as that of the inner periphery of the tank 1. A plurality of small apertures 110a1, 110b1 and 111b for allowing the refrigerant to pass through are provided in approximately the whole area of the semi-circular upper wall 110a, the flat side wall 110b and the bottom lid member 111, respectively, in a scattered manner. The bottom lid member 111 has a plurality of downwardly protruded legs 113, 113 each integrally formed with the lid member 111. As shown in FIG. 6B, the dryer unit 2 is disposed in the tank 101 with the legs 113, 113 placed on a bottom of the tank 101 so as to be lifted from the bottom at a certain height.

As shown in FIGS. 7 and 8, a pair of fixing arms 114, 114 continuously extends from circumferential side end portions of the curved-side portion 110c, i.e., connecting portions of the flat side wall 110b and the curved-side wall 110c. The pair of fixing arms 114, 114 are slightly outwardly opened 50 as to have a radius slightly larger than a radius of the tank 101, whereby the dryer unit 102 is fixed in the tank 101 by resiliently pressing the pair of fixing arms 114, 114 against an inner surface of the tank 101.

As shown in FIG. 6, the separating wall 103 is a flat wall and placed in the upper inner space of the tank 101 to divide the upper inner space into an inlet side upper space 115 located at the refrigerant inlet port side and an outlet side upper space 116 located at the refrigerant outlet port side. As shown in FIG. 8, the separating wall 103 upwardly extends from and is integrally formed at the upper edge of the flat side wall 110b. The separating wall 103 is provided with a plurality of apertures 117 formed in a scattered state for allowing a communication between the inlet side upper space 115 and the outlet side upper space 116. In this embodiment, although the separating wall 103 is integrally formed with the semi-circular cylindrical member 110, the separating wall 103 may be separately formed from the semi-circular cylindrical member 110.

The separating wall 103 is provided with a pair of engaging protrusions 103a and 103b which are upwardly protruded from and integrally formed at an upper edge of the separating wall 103. As shown in FIG. 6B, the protrusions 103a and 103b are fitted in corresponding engaging holes 106a and 106b formed in the inner surface of the header 106, whereby the separating wall 103 is fixed in the tank 101 in a predetermined position. As shown in FIGS. 7 and 8, the pair of protrusions 103a, 103b are formed such that the distance between the left protrusion 103a and the left end of the upper edge of the partitioning wall 103 is different from the distance between the right protrusion 103b and the right end of the upper edge. Thus, the dryer unit 102 is prevented from being assembled in a reversed position in which the dryer unit 102 is rotated from the predetermined position by 180 degrees in a circumferential direction of the tank 101. These engaging protrusions 103a and 103b also function to prevent the separating wall 103, or the dryer unit 102, from being rotated in the tank 101 after the completion or assembly.

As shown in FIGS. 6A and 6B, the oil returning pipe 104 is disposed along a direction of up-and-down in a state that it penetrates holes 110a2 and 111a formed in the upper wall 110a and the bottom lid member 111 of the dryer unit 102. The oil returning pipe 104 is disposed in the tank 101 such that the lower inlet opening 104a is located at a bottom portion of the tank 101 and the upper outlet opening 104b is located within the refrigerant outlet port 108. Although the oil returning pipe 104 is formed to be separated from the dryer unit 102, the oil returning pipe 104 may be integrally formed with the dryer unit 102.

Figure 9A:
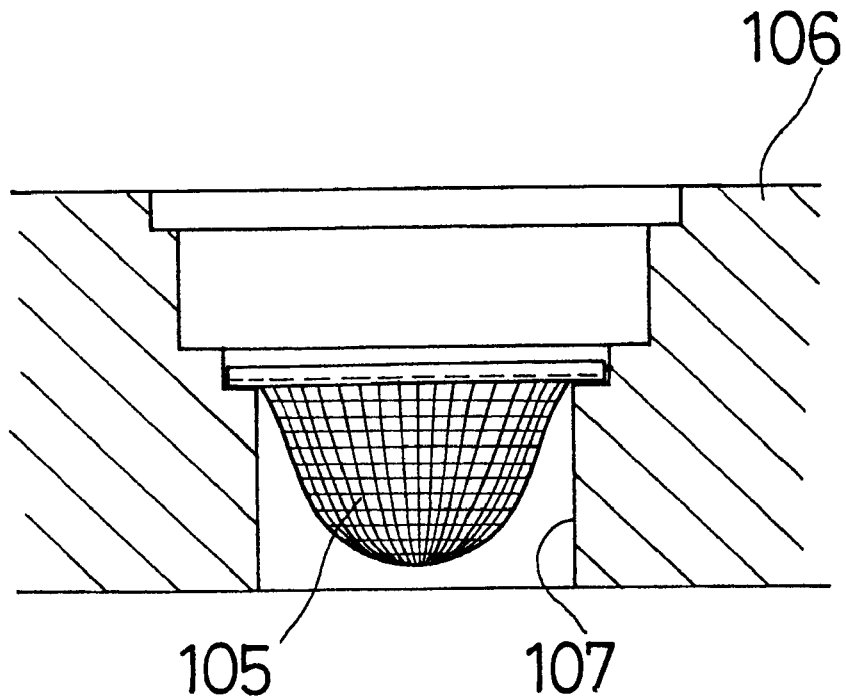
FIG. 9A is a side view of a filter fitted in a refrigerant inlet port of the accumulator.
Figure 9B:
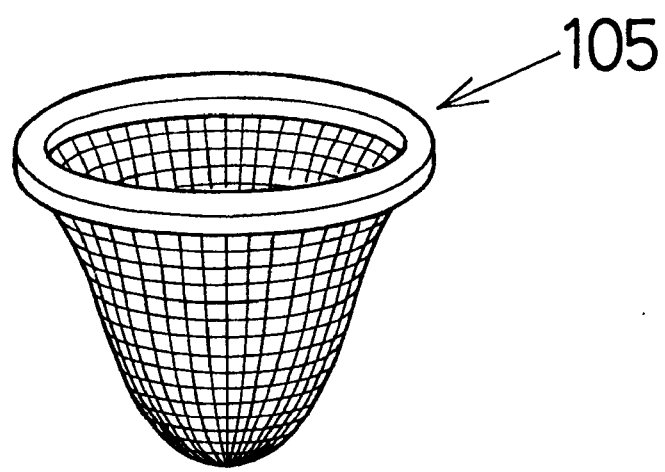
FIG. 9B is a perspective view of the filter.

As shown in FIGS. 9A and 9B, a mesh-type filter 105 is fitted in the refrigerant inlet port 107.

In assembling the accumulator, the semi-circular cylindrical member 110 and the bottom lid member 111 are combined to form the dryer unit 102 such that the oil returning pipe 104 is disposed in the holes 110a2 and 111a of the upper wall 110a and the bottom lid member 111 and the dryer agent 112 is confined in a space formed by the semi-circular cylindrical member 110 and the bottom lid member 111. Then, the dryer unit 102 is inserted into the tank 101 such that the semi-circular cylindrical member 110 is positioned below the refrigerant outlet port 108, as shown in FIG. 6B. In this state, the fixing arms 114, 114 of the dryer unit 102 resiliently press against an inner surface of the tank 101 to fix the dryer unit 102 in the tank 101. Thereafter, the header 106 is fitted in the upper opening of the tank 101 with the engaging protrusions 103a and 103b engaged with engaging holes 106a and 106b. Thus, assembly of the accumulator can be completed easily.

The tank 101, the header 106, and the like may be made of metallic materials having a good formability such as an aluminum, an aluminum alloy, or the like. The separating wall 103, the dryer unit 102, the oil returning pipe 104, and the like, may be preferably made of a synthetic resin such as a polyamide resin.

In the above-described accumulator, the mixture of liquid refrigerant and gaseous refrigerant, which has been evaporated in an evaporator (not shown), in introduced into the refrigerant inlet side upper space 115 located at the refrigerant inlet port side through the refrigerant inlet port 107 of the header 106 as shown in FIG. 6B. Alien substances are captured by the filters 105 provided in the refrigerant inlet port 107.

The refrigerant introduced into the inlet upper space 115 directly reaches the bottom of the tank 101 because there is no obstacle between the refrigerant inlet port 107 and the bottom of the tank 101. Because the refrigerant directly reaches the bottom of the tank 101 to collide therewith, the refrigerant is vigorously agitated at around the bottom of the tank 101 to cause turbulence of the refrigerant. Thus, lubricant oil and liquid refrigerant, which tend to stay at the bottom portion of the tank 101 in two separate layers in a conventional accumulator, are vigorously agitated. Thus, the refrigerant begins to boil due to energies caused during the agitation of the refrigerant. As a result, the lubricant oil dissolves again in the boiled and evaporated refrigerant to be contained in the gaseous refrigerant and uniformly mixed with the liquid refrigerant at the bottom of the tank 101.

The gaseous refrigerant is introduced into the outlet side upper space 116 located at the outlet port side 108 through the apertures of the dryer unit 101 and the separating wall 103, and then flows out of the tank 101 via the refrigerant outlet port 108 toward a compressor (not shown). Water contained in the refrigerant is absorbed by the dryer agent 112. The lubricant oil mixed with the liquid refrigerant is sucked up from the lower inlet opening 104a of the oil returning pipe 104 and introduced into a compressor (not shown) together with the gaseous refrigerant.

Figure 15:
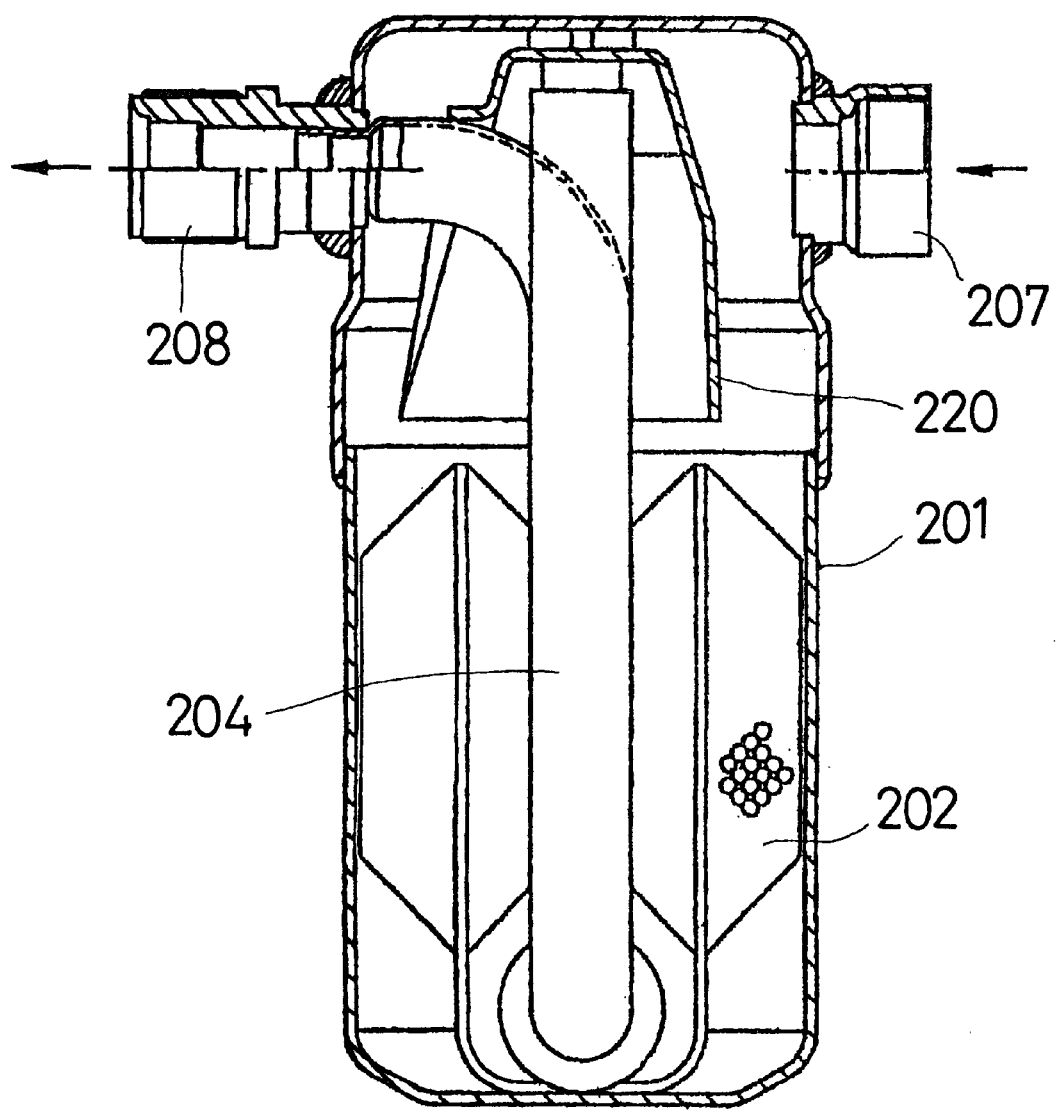
FIG. 15 is a front cross-sectional view of a conventional accumulator.

The accumulator mentioned above enables to circulate the lubricant oil in a refrigerant cycle while preventing the lubricant oil from retaining in the tank 101. According to the accumulator of the aforementioned embodiment, it was confirmed that the amount of the lubricant oil remained in the tank 101 was decreased by 47% as compared with the conventional accumulator shown in FIG. 15.

It is preferable that a ratio of a total area of the plurality of the apertures 117 formed in the separating wall 103 to a cross-sectional area of the refrigerant inlet port 107 falls within a range of from 1.3 to 3 because of the following reasons: If the ratio is smaller than the lower limit ratio, i.e., the ratio of 1.3, the inner pressure of the tank 101 may be caused to rise extraordinarily if the surface level of the liquid refrigerant remained in the tank 101 rises over the upper wall 110a of the dryer unit 102. To the contrary, if it exceeds the upper limit ratio, i.e., the ratio of 3.0, the separating wall 103 does not function as a separator because the refrigerant inlet port 107 becomes in direct communication with the refrigerant outlet port 108 as if both the ports 107, 108 are directly communicated with each other.

In order to effectively suck up the lubricant oil, it is preferable that a cross-sectional area of the oil returning pipe 104 is 20–50% of that of the refrigerant outlet port 108.

Figure 10:
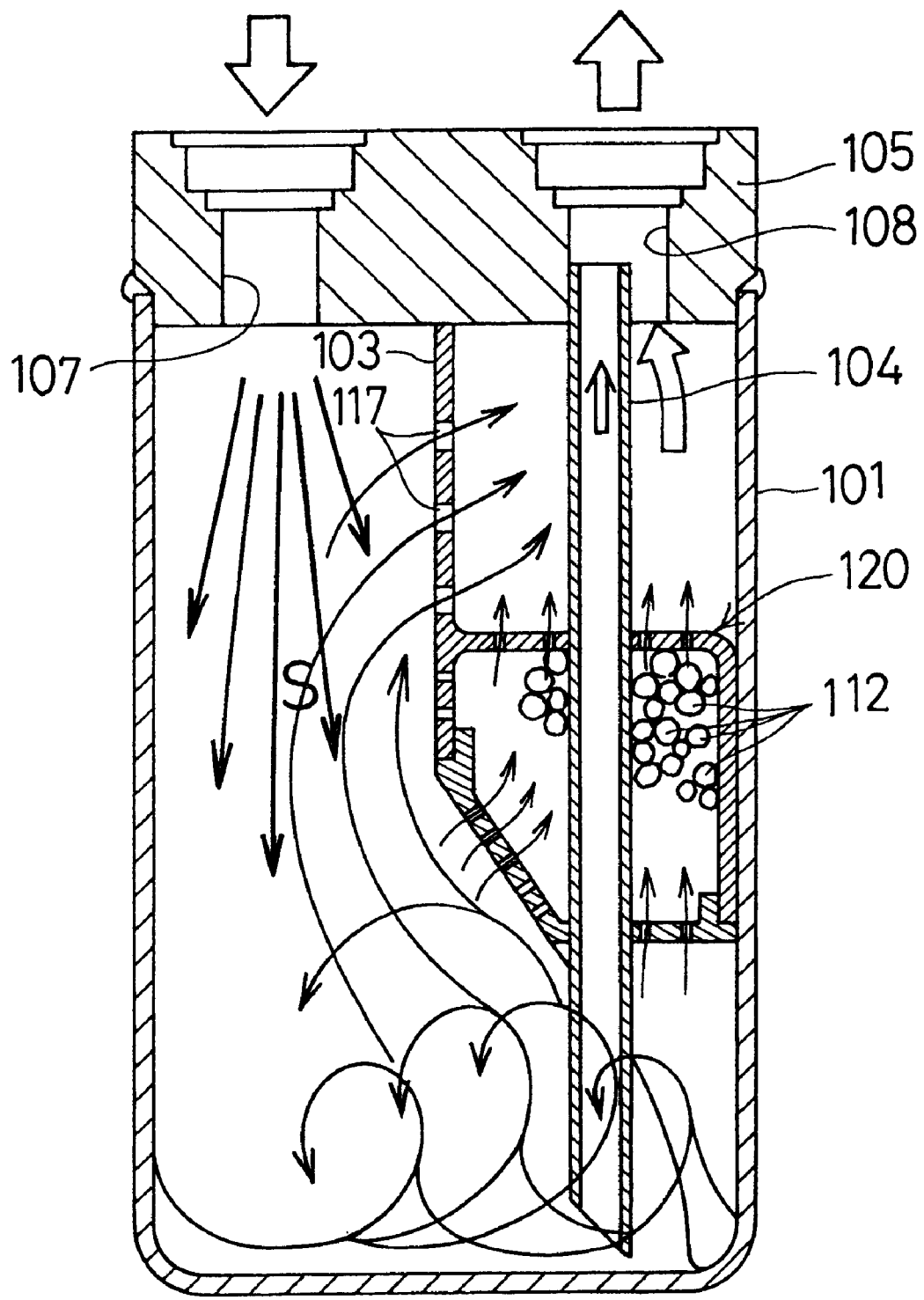
FIG. 10 is a front cross-sectional view of an accumulator of a third embodiment according to the present invention.

FIG. 10 illustrates a modified embodiment of an accumulator. This modified accumulator is different from the aforementioned accumulator in a configuration of a dryer unit. The dryer unit 120 is formed to have a slanted bottom wall at the refrigerant inlet port side, forming a swirl region (a region for causing a swirl of the refrigerant) between the bottom of the tank 101 and the dryer unit 120. This causes a more effective and vigorous agitation of the refrigerant which is introduced from the refrigerant inlet port 107 and directly reached and collided against the bottom of the tank 101 because the refrigerant can be made to curl or swirl in the swirl region below the dryer unit 120.

Since the other portions are the same as in the aforementioned embodiment, the explanation will be omitted by allotting the same reference numerals to the corresponding portions.

Figure 11:
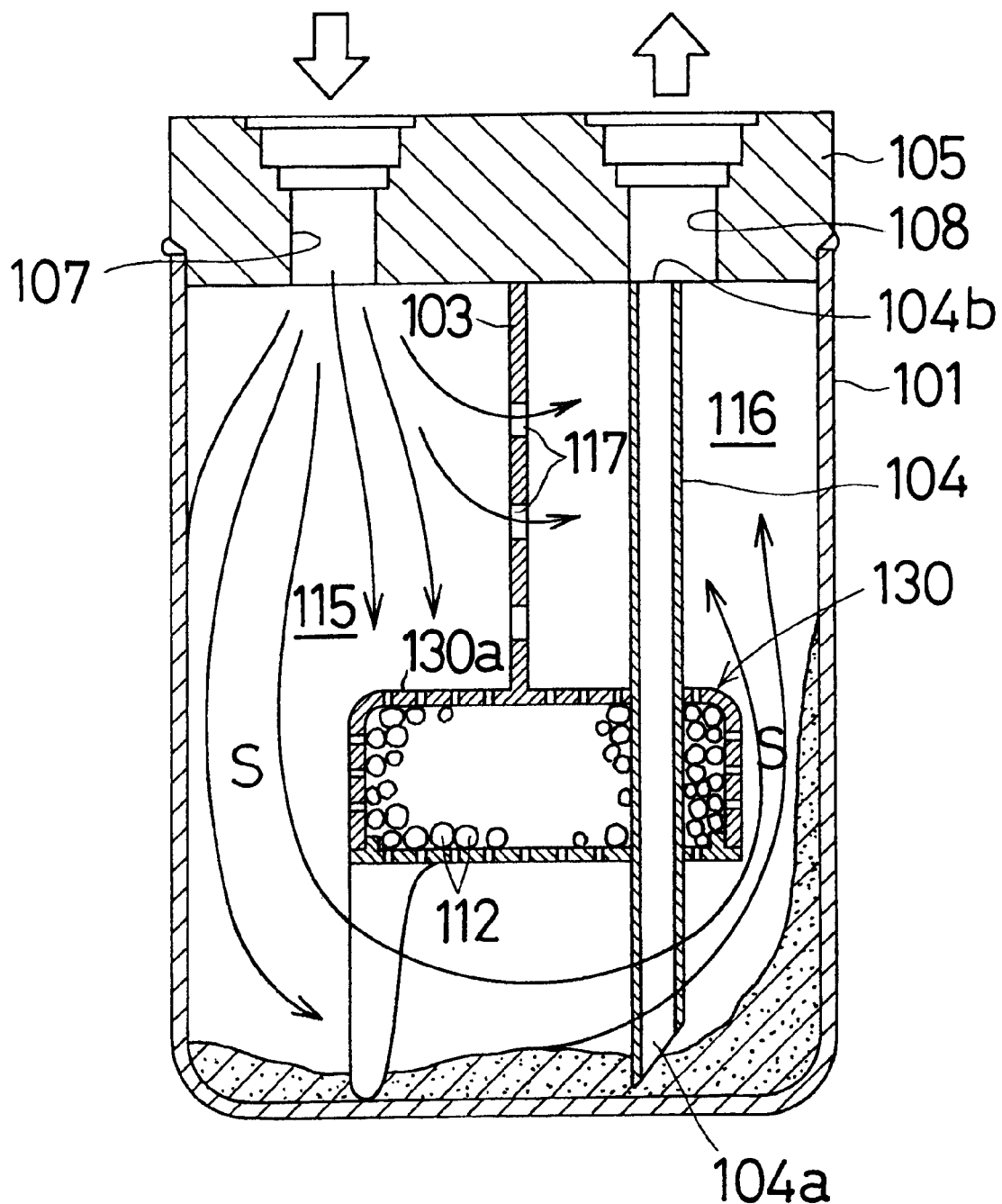
FIG. 11 is a front cross-sectional view of an accumulator of a fourth embodiment according to the present invention.

FIG. 11 illustrates another embodiment of the present invention. This accumulator is slightly different from the aforementioned accumulators in configuration and position of the dryer unit 130. The dryer unit 130 has a generally cylindrical shape having an outer diameter smaller than the inner diameter of the tank 101. The dryer unit 130 is S disposed in the tank 101 such that the central axis of the dryer unit 130 is slightly sifted toward the refrigerant outlet port side to form a gap, i.e., a refrigerant flow passing space S, between the outer surface of the dryer unit 130 and the inner surface of the tank 101. Because the refrigerant flow passing space S is also formed at the refrigerant outlet port side, the flow resistance of the refrigerant is decreased as compared to the aforementioned embodiments. In this embodiment, a part of the refrigerant introduced from the refrigerant inlet port 107 directly reaches and collides against the bottom of the tank 101, and the rest of the refrigerant collides against the upper wall 130a of the dryer unit 130 first and then reaches the bottom of the tank 101.

In this embodiment, the refrigerant is vigorously agitated at the bottom of the tank 101, and then sucked up by the oil returning pipe 104 to be introduced to a compressor (not shown) together with liquid refrigerant.

Since the other portions are the same as in the aforementioned embodiments, the explanation will be omitted by allotting the same reference numerals to the corresponding portions.

Figure 12A:
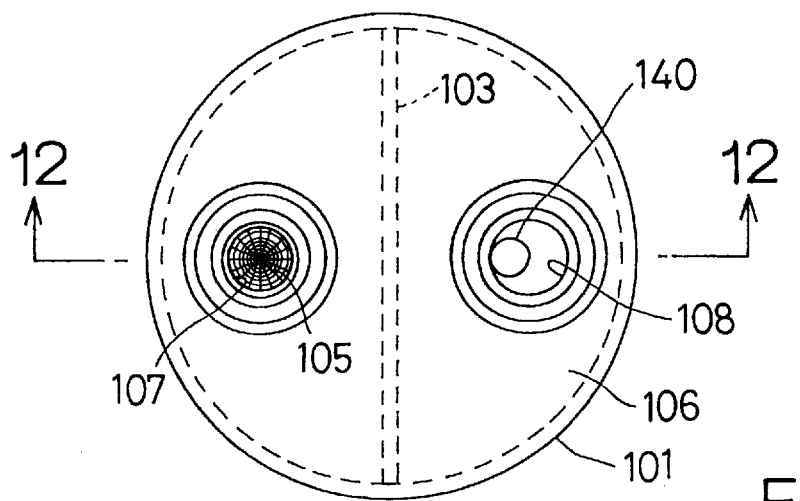
FIG. 12A is a top plan view of the accumulator.

FIGS. 12 to 14 illustrate a modified embodiment of the accumulator shown in FIGS. 6 to 9.

As clearly illustrated in FIG. 14, the separating wall 103 of the accumulator according to this embodiment has a pair of elongated rectangular liquid refrigerant passing openings 118, 118 which communicate the inlet side upper space 115 at the refrigerant inlet port side and the outlet side upper space 116 at the refrigerant outlet port side with each other at a lower end portion of the separating wall 103. The reason why the liquid refrigerant passing openings 118, 118 are formed at the lower end portion of the separating wall 103 is as follows: In a case where an excessive amount of liquid refrigerant is provided in the refrigerant cycle, or a rotation rate of a compressor is suddenly changed in such a situation when an engine connected to the compressor is started or stopped, liquid refrigerant, which is accumulated in a space surrounded by the separating wall 103, the upper wall of the dryer unit 102 and the peripheral wall or the tank 101 may sometimes be sucked up from the refrigerant outlet port 108. The liquid refrigerant supplied to a compressor (not shown) may not only cause trouble of the compressor, but also deteriorate the cooling performance in the refrigeration cycle. Thus, it is preferable to avoid an accumulation or liquid refrigerant on the dryer unit 102. Accordingly, in this embodiment, the liquid refrigerant passing openings 118, 118 are formed at the lower end portion of the separating wall 103 so as to return the liquid refrigerant on the dryer unit 102 into the inlet side upper space 115. This prevents the liquid refrigerant on the dryer unit 102 from being sucked up through the refrigerant outlet port 108.

The shape, number and/or size of the liquid refrigerant passing opening 118 is not limited to the aforementioned embodiment, provided that the opening 118 does not deteriorate the functions as an accumulator and can allow the liquid refrigerant on the dryer unit 102 to flow into the upper inlet side space 115. In this embodiment, a pair of elongated rectangular openings 118, 118 are formed at the lower end portion of the separating wall 103 along the direction of width thereof. The lower edge 118a of the opening 118 coincides with the upper surface of the upper wall 110a of the dryer unit 102 so that the liquid refrigerant can easily pass through the opening lie. It is preferable that the height of each opening 118, i.e., the height X from the lower end 118a to the upper end 118b of the opening 118, is 15 mm or less. It was confirmed by the inventor's experiments that in a case where the height X met the aforementioned range the liquid refrigerant on the dryer unit 102 smoothly flowed into the inlet side upper space 115 and the liquid-gas-separating function of the accumulator was properly performed even when the compressor runs at a high rotation rate.

The separating wall 103 having the liquid refrigerant passing openings 118, 118 can be applied to the previously mentioned embodiments.

Figure 12B:
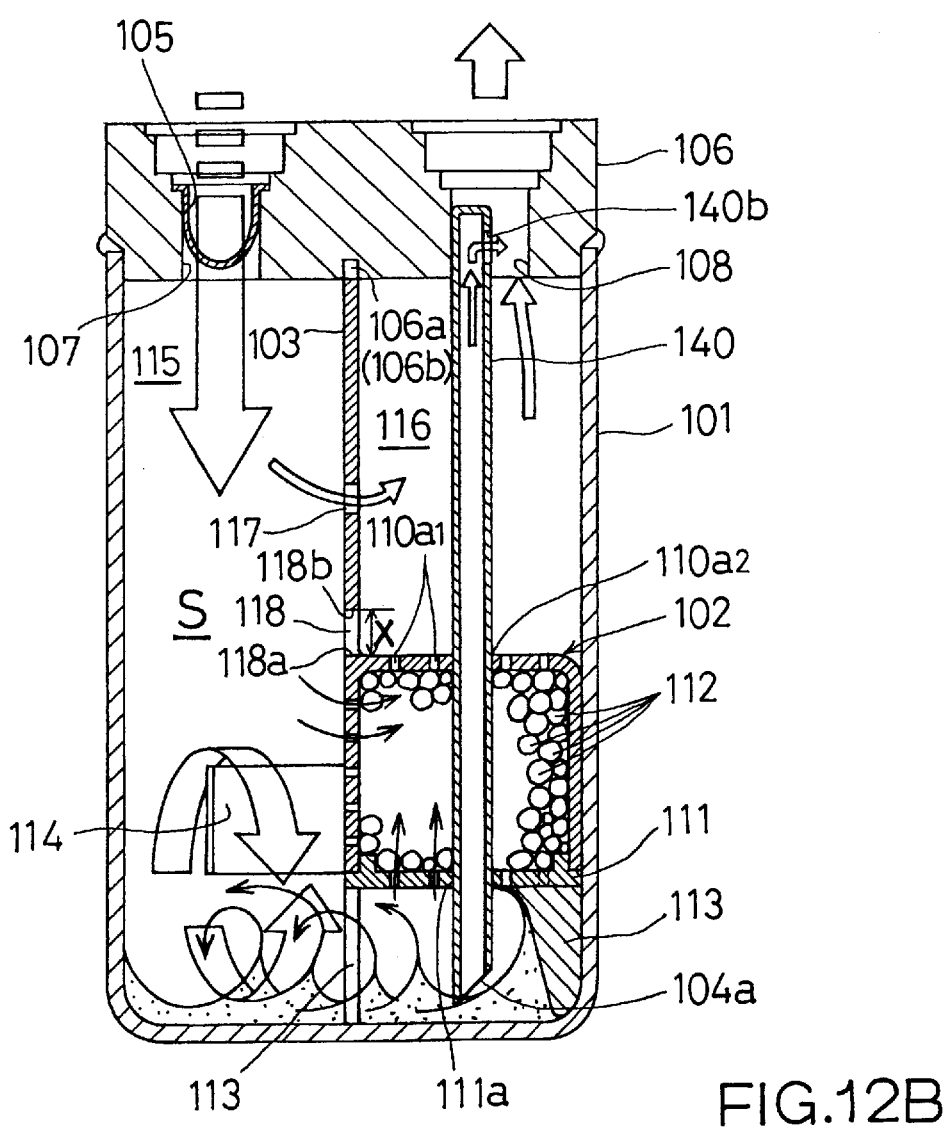
FIG. 12B is a cross-sectional view taken along the lines 12—12 of rig. 12A.

Further, the oil returning pipe 140 of the embodiment shown in FIGS. 12 to 14 is the same as that shown in the previously mentioned embodiments except for the upper outlet opening. In detail, in the oil returning pipe 140 shown in FIGS. 12 to 14, the upper end portion of the pipe 140 is closed, and an upper outlet opening 140b is formed at a side portion of the pipe 140 located slightly below the upper end thereof, as shown in FIGS. 12B, 13B, 13C and 14. The opening 140b is disposed within the refrigerant outlet port 108, as shown in FIG. 12B. In other words, the opening 140b is formed such that an angle θ formed between an opening direction of the upper outlet opening 140b and a flow direction of refrigerant passing thorough the refrigerant outlet port 108 is 90 degrees. The liquid in the tank 101 can be effectively sucked up by the oil returning pipe 140 by setting the opening direction of the upper outlet opening 140b, so as to form right angle relative to the flow direction or refrigerant passing through the refrigerant outlet port 108. In the present invention, the angle θ is not limited to 90 degrees, but may fall within a range meeting the formula of 0°<θ≦90°. The reason is as follows.

Under the condition that an oil returning pipe is disposed in a tank such that the lower end opening of the pipe is placed at the bottom of the tank and the upper end opening thereof is placed at the refrigerant inlet port, as shown in the previously mentioned embodiments, the height h of the liquid to be sucked in the oil returning pipe can be calculated by the following formula in theory:

$$h = c \times (\gamma_1/\gamma_2) \times (v_1^2 - v_2^2)/2g$$

wherein c, $\gamma_1$, $\gamma_2$, $v_1$, $v_2$ and g denotes a constant including friction coefficient in a pipe, a specific gravity of gaseous refrigerant, a specific gravity of liquid refrigerant, a flow velocity of gaseous refrigerant, a flow velocity of liquid refrigerant and an gravity acceleration(m/s$^2$), respectively.

However, it should be noted that in an actual operation the flow velocity $v_1$ of the gaseous refrigerant at around the outlet opening which is upwardly opened and formed at the upper end of the oil returning pipe is remarkably decreased. Thus, the flow velocity difference as defined in the above formula, i.e., $(v_1^2 - v_2^2)$, is remarkably decreased, resulting in a small theoretical height h. In order to keep the flow velocity difference, i.e., $(v_1^2 - v_2^2)$, as large as possible so as to increase the height h, the upper outlet opening 140b of the oil returning tube 140 is designed such that an angle θ formed between an opening direction of the upper outlet opening 140b of the oil returning tube 140 and a flow direction of refrigerant passing through the refrigerant outlet port 108 meets a formula of 0°<θ≦90°.

Figure 13A:
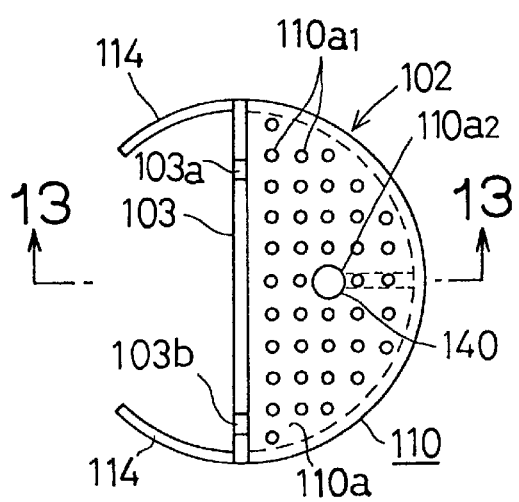
FIG. 13A is a top plan view of a dryer unit of the accumulator.
Figure 13C:
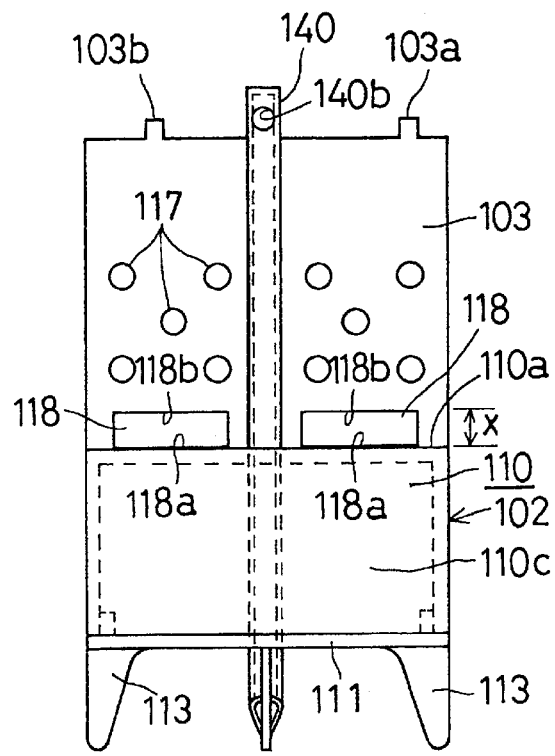
FIG. 13C is a right side view of the dryer unit.
Figure 13B:
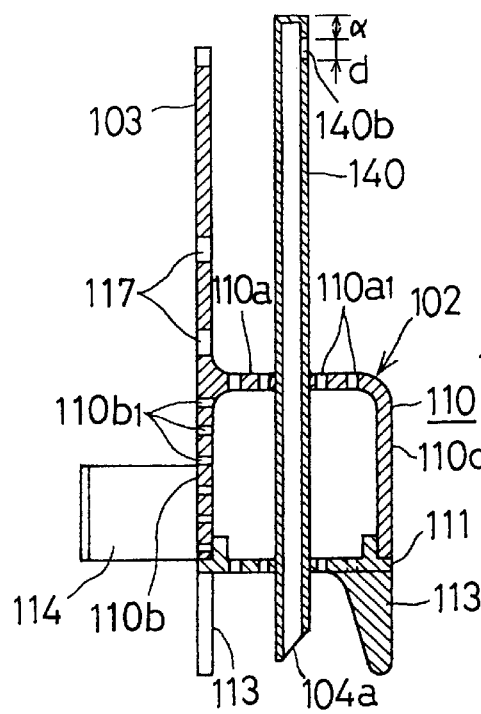
FIG. 13B is a cross-sectional view taken along the lines 13—13 of FIG. 13A.
Figure 13D:
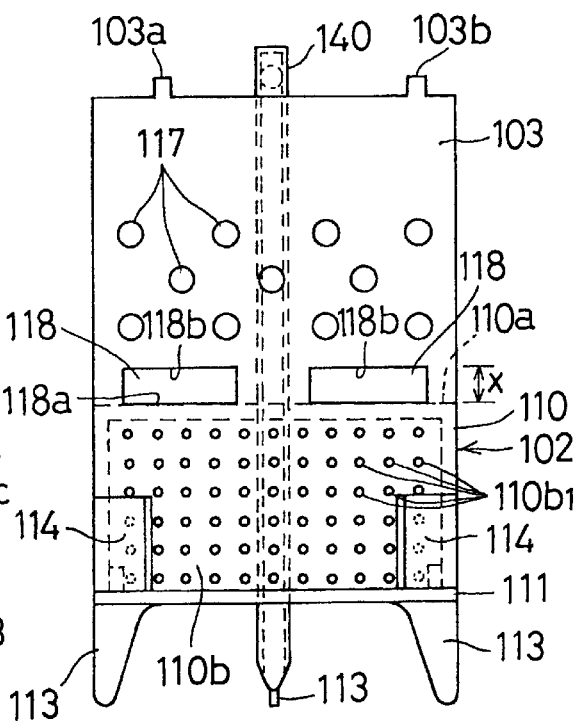
FIG. 13D is a left side view of the dryer unit.

It is preferable that the position of the upper outlet opening 140b, in other words the distance a from the upper end of the tube 140 to the upper edge of the opening 140b as shown in FIG. 13B, meets the formula of 0≦α≦10d, wherein d denotes a diameter of the upper outlet opening 140b.

The oil returning pipe 140 may be used in each of the previously mentioned embodiments, which enhances the functions of the oil returning pipe in each embodiment.

In this embodiment, the refrigerant introduced into the inlet upper space 115 directly reaches the bottom of the tank 101 through the refrigerant passing space S formed between the inner surface of the tank 101 and the dryer unit 102 to collide therewith. Thus, the refrigerant is vigorously agitated in the tank 101 to cause turbulence of the refrigerant. Thus, lubricant oil and liquid refrigerant, which tend to stay at the bottom portion of the tank in two separate layers in a conventional accumulator, are vigorously agitated. In addition, the refrigerant begins to boil due to energies caused during the agitation of the refrigerant. As a result, the lubricant oil dissolves again in the boiled and evaporated refrigerant to be contained in the gaseous refrigerant and uniformly mixed with the liquid refrigerant at the bottom of the tank 101. The lubricant oil mixed with the liquid refrigerant is introduced into a compressor (not shown) together with the gaseous refrigerant. Accordingly, the accumulator mentioned above enables to circulate the lubricant oil in a refrigerant cycle while preventing the lubricant oil from retaining in the tank 102.

In a case where the ratio of a total area of the plurality of the apertures 117 formed in the separating wall 103 to a cross-sectional area of the refrigerant inlet port 107 falls within a range of from 1.3 to 3, the refrigerant can pass through the dryer unit 102 while preventing both the inlet and outlet ports to be in a direct communication, and the inner pressure can be prevented from extraordinarily rising up even if the liquid level raises.

In a case where the oil returning pipe is disposed in a tank such that the lower inlet opening is disposed at the bottom of the tank and the upper outlet opening is disposed at the outlet port, and the cross-sectional area of the oil returning pipe is set to be 20–50% of that of the refrigerant outlet port, the lubricant oil in the tank can be effectively sucked up to introduce into a compressor.

In a case where a liquid refrigerant passing opening is formed at the lower end portion of the separating wall, so as to communicate the inlet side upper space and the outlet side upper space with each other, liquid refrigerant can be effectively prevented from accumulating in an upper space at the refrigerant outlet port side, and thus also preventing the liquid refrigerant from being sucked up through the refrigerant outlet port in such a case where the rotational rate of the compressor connected to an engine is suddenly changed when the engine is started or stopped.

In a case where the upper outlet opening of the oil returning tube is designed such that an angle θ formed between an opening direction of the upper outlet opening and a flow direction of refrigerant passing through the refrigerant outlet port meets a formula of 0°<θ≦90°, the liquid refrigerant in the bottom portion of the tank can be effectively sucked up.

The terms and expressions which have been employed herein are used as terms of description and not of limitation, and there is no intent, in the use of such terms and expression, of excluding any of the equivalents of the features shown and described or portions thereof, but it is recognized that various modifications are possible which fall within the scope of the presently claimed invention.

What is claimed is:

1. An accumulator, comprising:

a tank;

a refrigerant inlet port provided at an upper portion of said tank;

a refrigerant outlet port provided at said upper portion of said tank;

a dryer unit disposed in said tank at an intermediate portion along a direction of height of said tank;

a separating wall extending upwardly from said dryer unit and dividing an upper inner space of said tank above said dryer unit into an inlet side upper space located at said refrigerant inlet port side and an outlet side upper space located at said refrigerant outlet port side, said separating wall having a plurality of apertures formed in a scattered state for communicating said inlet side upper space and said outlet side upper space with each other; and an oil returning tube having a lower inlet opening and an upper outlet opening, wherein said oil returning tube is disposed in said tank such that said lower inlet opening and said upper outlet opening are located at a bottom portion of said tank and at said refrigerant outlet port, respectively.

2. The accumulator as recited in claim 1, wherein a refrigerant passing space is formed between an inner surface of said tank and said dryer unit so that refrigerant introduced into said tank through said refrigerant inlet port reaches directly or indirectly said bottom portion of said tank through said refrigerant passing space, whereby said refrigerant is agitated in said tank.

3. The accumulator as recited in claim 1, wherein said dryer unit has a semi-circular cylindrical configuration as seen from above having an upper wall, a lower wall and a flat side wall, each of said upper wall, said lower wall and said flat side wall being provided with a plurality of apertures for passing refrigerant.

4. The accumulator as recited in claim 1, wherein said separating wall is integrally formed with said dryer unit.

5. The accumulator as recited in claim 2, wherein said dryer unit comprises a cup-like cover member and a bottom lid member, and an opening of said cup-like cover is closed by said bottom lid member to accommodate a dryer agent therein.

6. The accumulator as recited in claim 2, wherein said dryer unit is disposed below said refrigerant outlet port in said tank.

7. The accumulator as recited in claim 2, wherein said dryer unit is provided with a leg downwardly extended therefrom for supporting said dryer on a bottom of said tank, and said dryer unit is disposed in said tank with said leg placed on said bottom so as to be lifted up from said bottom at a certain height.

8. The accumulator as recited in claim 3, wherein said dryer unit is provided with a pair of fixing arms protruded therefrom, and is fixed in said tank by resiliently pressing said pair of fixing arms against an inner surface of said tank.

9. The accumulator as recited in claim 1, wherein a ratio of a total area of said plurality of said apertures to a cross-sectional area of said refrigerant inlet port falls within a range of from 1.3 to 3.

10. The accumulator as recited in claim 1, wherein a cross-sectional area of said oil returning pipe is 20 to 50% of a cross-sectional area of said refrigerant outlet port.

11. The accumulator as recited in claim 1, wherein said separating wall has an opening for communicating said inlet side upper space and said outlet side upper space with each other at a lower end portion of said separating wall.

12. The accumulator as recited in claim 1, wherein said upper outlet opening of said oil returning tube is designed such that an angle θ formed between an opening direction of said upper outlet opening of said oil returning tube and a flow direction of refrigerant passing through said refrigerant outlet port meets a formula of $0°<\theta\leq 90°$.

13. The accumulator as recited in claim 1, wherein said oil returning tube is disposed such that said oil returning tube penetrates said dryer unit.

14. The accumulator as recited in claim 1, wherein said tank is a bottom-closed cylindrical member with a top opening closed by a header, and wherein said refrigerant inlet port and said refrigerant outlet port are formed in said header.

15. The accumulator as recited in claim 1, wherein said tank and said header are made of aluminum or its alloy.

\* \* \* \* \*